United States Patent
Matula (10) Patent No.: US 9,752,280 B2
(45) Date of Patent: Sep. 5, 2017

(54) ARRANGEMENT FOR AND A METHOD OF MANUFACTURING A FIBROUS WEB

(71) Applicants: WETEND TECHNOLOGIES OY, Savonlinna (FI); Valmet Technologies Oy, Espoo (FI)

(72) Inventor: Jouni Matula, Savonlinna (FI)

(73) Assignees: Valmet Technologies Oy, Espoo (FI); Wetend Technologies Oy, Savonlinna (FI)

(*) Notice: Subject to any disclaimer, the term of this patent is extended or adjusted under 35 U.S.C. 154(b) by 0 days.

(21) Appl. No.: 15/200,973

(22) Filed: Jul. 1, 2016

(65) Prior Publication Data
US 2016/0312408 A1  Oct. 27, 2016

Related U.S. Application Data

(62) Division of application No. 14/769,764, filed as application No. PCT/FI2014/050135 on Feb. 21, 2014, now Pat. No. 9,447,543.

(30) Foreign Application Priority Data

Feb. 22, 2013 (FI) .................................. 20135157 U (51) Int. Cl.
| | |
|---|---|
| *D21H 17/63* | (2006.01) |
| *D21F 11/00* | (2006.01) |
| *C04B 28/10* | (2006.01) |
| *C01F 11/18* | (2006.01) |
| *D21F 1/00* | (2006.01) |
| *D21H 17/00* | (2006.01) |

(52) U.S. Cl.
CPC .......... *D21F 11/002* (2013.01); *C01F 11/181* (2013.01); *C04B 28/10* (2013.01); *D21F 1/00* (2013.01); *D21H 17/63* (2013.01); *D21H 17/00* (2013.01); *Y02P 40/18* (2015.11)

(58) Field of Classification Search
CPC . D21F 1/00; D21F 11/00; C04B 28/10; C01F 11/18
USPC ....................................................... 162/216
See application file for complete search history.

(56) References Cited

U.S. PATENT DOCUMENTS

| | | |
|---|---|---|
| 3,871,952 A | 3/1975 | Robertson |
| 4,299,655 A | 11/1981 | Skaugen |
| 6,500,302 B2 | 12/2002 | Dwiggins et al. |

FOREIGN PATENT DOCUMENTS

| | | |
|---|---|---|
| EP | 1 064 427 | 3/2004 |
| EP | 1 219 344 | 12/2006 |
| FI | 115148 | 3/2005 |
| FI | 116473 | 11/2005 |
| WO | 2005/032704 | 4/2005 |
| WO | 2009/103853 | 8/2009 |
| WO | 2011/154610 | 12/2011 |

OTHER PUBLICATIONS

European Search Report mailed May 23, 2014.

*Primary Examiner* — Mark Halpern (57) ABSTRACT

A method to form a fibrous web including: introducing a furnish to a headbox of a fiber web machine, wherein the furnish includes a thick stock component and a filtrate, injecting a gas into to the furnish to form a foamed furnish, and laying the foamed furnish on a wire or between wires of a wire section of the fiber web machine to form the fibrous web from the foamed furnish.

10 Claims, 5 Drawing Sheets

Fig. 1

Prior Art

ARRANGEMENT FOR AND A METHOD OF MANUFACTURING A FIBROUS WEB

RELATED APPLICATIONS

This application is a divisional of U.S. patent application Ser. No. 14/769,764 (now U.S. Pat. No. 9,447,543) filed Aug. 21, 2015, which is the U.S. national phase of International Application No. PCT/FI2014/050135 filed 21 Feb. 2014 which designated the U.S. and claims priority to Finnish Patent Application No. 20135157 filed 22 Feb. 2013, the entire contents of these applications are incorporated by reference.

TECHNICAL FIELD

The present invention relates to an arrangement for and a method of manufacturing a fibrous web, i.e. paper or board. The present invention relates specifically to so-called foam formation of a fibrous web, where the fibers are delivered to the formation section of the fiber web machine by means of foam. A further advantageous feature of the present invention is the possibility of producing precipitated calcium carbonate (PCC) in the paper or board making stock simultaneously, i.e. in-line, with the formation of fibrous foam, by using flue gas in the foam formation in place of air or some other gas.

BACKGROUND ART

For more than a century paper, board and tissue have been manufactured by using a fiber furnish where the fibers have been dispersed in water, and the dilute furnish is introduced from a headbox onto a wire of a fiber web machine, where the water is removed through the wire and the fibers remain on the wire forming a web. Suggestions and attempts have been made during the last few decades to replace water as the fiber suspending medium with foam, as foam has some attractive properties, like for instance its capability of suspending solid particulates having greatly varying specific gravity. In other words, once solid particulates are mixed evenly into foam the foam bubbles carry the solid particulates, practically seen, in the same order on the wire of the fiber web machine. The foam bubbles maintain their position in the foam irrespective of the specific gravity or the weight of the solid particulate in the bubble.

Prior art knows a few methods of manufacturing paper or board by means of using foam instead of water as the fiber suspending medium.

U.S. Pat. No. 4,299,655 discusses a fibrous foam generator for papermaking machine. It discloses a dispersion distribution arrangement used in a paper making machine wherein foam is delivered through an upstream line by means of a fan pump to a dispersion distribution chamber. The distribution chamber is designed for the dispersion of fibers in foam, and for the regeneration of foam in its flow to a headbox. An upstream line introduces foam from a separate generating apparatus to the distribution chamber. A further input line may be provided with a discharge nozzle centrally located in the upstream line for the controlled input of air and in some instances, additional surfactant so that the additional foam regeneration may occur. The foam regeneration, and the distribution and dispersion of fibers occur within the chamber, which receives paper making stock from its preparation. The chamber is flat on its ends, and within the chamber is located a movable plug, which is provided with means for introducing the paper making stock to the chamber. The plug is arranged to be movable in the direction of the liquid flow. The plug leaves between itself and the internal walls of the chamber a narrow gap along which the foam flows and into which the paper making stock is introduced. The document teaches that the dispersion distribution chamber is positioned in front of the headbox so that the foam with the suspended fibers flows to a headbox and out through a slice opening onto a traveling forming surface, wherein the liquid passes through the forming surface and the distributed fibers form a mat on the traveling forming surface.

In accordance with the process discussed in U.S. Pat. No. 6,500,302B2 the foamed fiber furnish is made up from aqueous slurry of natural or synthetic fibers or mixtures of fibers and foamed liquid carrier just prior to its introduction to the headbox. The foam is withdrawn from foam storage silo to a positive displacement fan pump. A pulp slurry containing fibers is drawn from machine chest and is added to a foamed liquid comprising water, air and surfactant containing 55 to 80 percent air by volume for forming a foamed fiber furnish having a consistency in the range of from about 0.1 to about 3 weight percent fiber by means of simple mixing caused by natural turbulence and mixing inherent in the process elements at the inlet to the fan pump in the amount necessary to form the foamed-fiber furnish of the desired consistency.

In other words, in prior art foam processes relating to paper making the foam is generated in a separate apparatus, which is usually a powerful agitator, where surfactant is added to water and the mixture is agitated strongly to mix air therein. Normally the thus created foam contains 50-85% air by volume. As discussed above there are several optional devices for mixing fibers into the foam. Sometimes fibers are mixed in a so called foam pulper where foam and fibers are mixed by strong agitation before being pumped via the headbox of the fiber web machine onto the wire.

A clear problem in the above discussed foam processes is the complicated or at least expensive equipment needed for the production and regeneration of foam. The same equipment also occupies a considerable space at the mill and has a high energy consumption. Sometimes, especially in cases where existing paper mills using conventional water-based furnish are planned to be converted to utilising foam formation, the volumes the foam requires are so high that there is no room for such equipment that would be able to maintain the earlier production capacity but a part of the capacity has to be sacrificed. In prior art processes the formation of the foam itself has been performed, for natural reasons, relatively far from the headbox, which means that the foam has to be transferred from its production to the headbox via a pipeline, whereby both the design and use of the pipeline is a challenging task. A further problem relates to the pumping of foam, as the foam cannot be pumped with off-the-shelf standard centrifugal pumps, but specifically designed pumps have to be used. This is yet another factor increasing the additional costs involved in the foam process compared to traditional paper making.

BRIEF SUMMARY OF INVENTION

Thus an object of the present invention is to develop a novel arrangement for and a method of manufacturing paper or board by using a foam process that solves at least one of the above discussed problems.

Another object of the present invention is to develop such a novel arrangement for and a method of manufacturing paper or board by using a foam process that simplify the equipment needed in the manufacture of foam.

A further object of the present invention is to develop such a novel arrangement for and a method of manufacturing paper or board by using a foam process that simplify the equipment needed in the preparation of mixture of foam and fibers.

A still further object of the present invention is to develop such a novel arrangement for and a method of manufacturing paper or board by using a foam process that avoids the use of specific pumps capable of pumping foam.

At least one of the objects of the present invention is fulfilled by an arrangement for manufacturing a fibrous web, the arrangement comprising means for preparing furnish of at least one thick stock component and filtrate, means for delivering furnish to a headbox of a fiber web machine, wherein the arrangement comprises a headbox feed pipe provided with an injection mixing station for introducing and mixing gas into furnish for preparing a foamed furnish.

At least one of the objects of the present invention is fulfilled by a method of manufacturing a fibrous web, the method comprising the steps of preparing furnish of at least one thick stock component and filtrate, introducing furnish to a headbox of a fiber web machine, and laying furnish on a wire or between wires of a wire section of a fiber web machine for forming a web, the invention further comprising, in connection with the step of introducing furnish to the headbox, the step of injecting gas to the furnish for preparing a foamed furnish.

Other characterizing features of the arrangement and the method of the present invention become evident in the accompanying dependent claims.

The arrangement and the method of the present invention bring about several advantages in comparison to prior art foam processes. At least the following advantages may be listed:

Simplified equipment and reduced investment and running costs, no separate foam preparation, no pumps specifically designed for foam, Foam production just upstream of the headbox—no transfer piping and pumps, Possibility to add chemicals, fillers, sizing agents, etc. to the fibrous furnish simultaneously with foam formation, Possibility to produce precipitated calcium carbonate (PCC) simultaneously, i.e. in-line with foam formation, Possibility to utilize flue gas in the production of both foam and PCC, and A good way to bind carbon dioxide from flue gas and reduce the use of fresh $CO_2$.

BRIEF DESCRIPTION OF DRAWING

The method of and the arrangement for manufacturing a fibrous web in accordance with the present invention is described more in detail below, with reference to the accompanying drawings, in which.

DETAILED DESCRIPTION OF DRAWINGS

Figure 1:
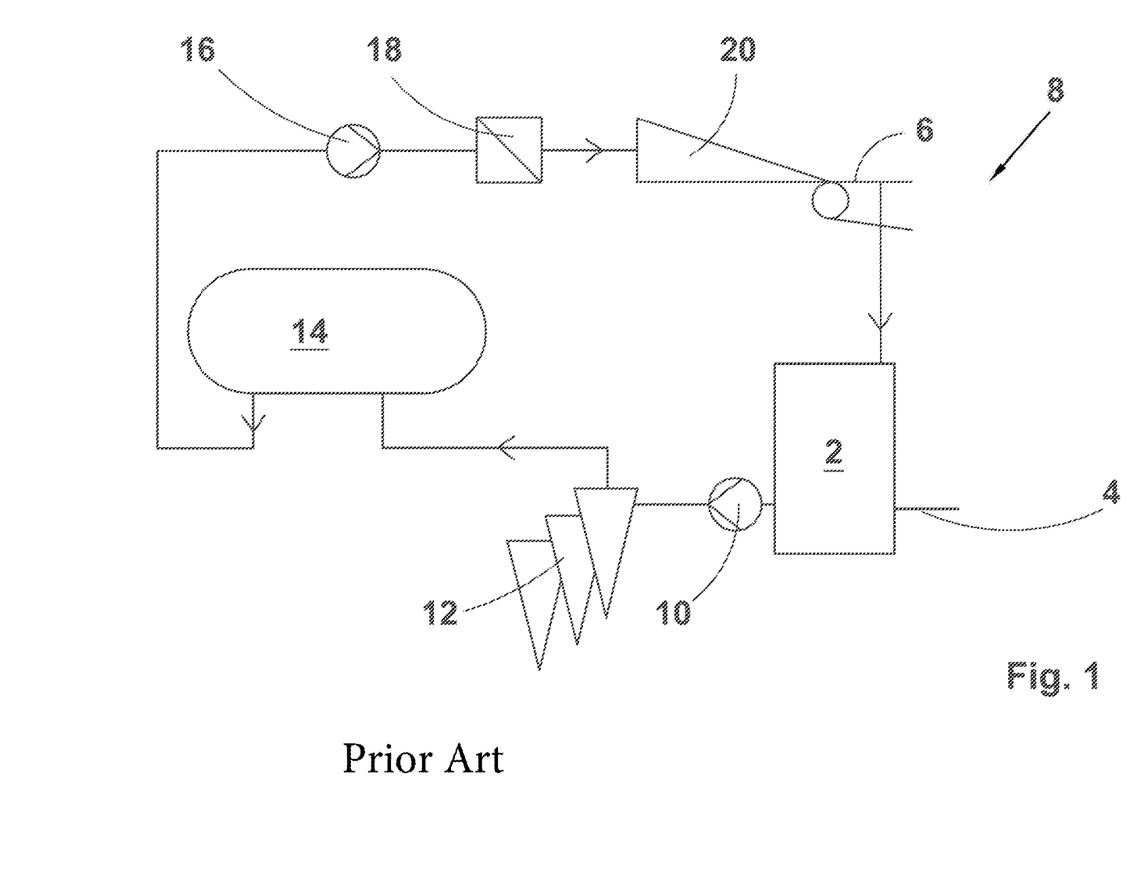
FIG. 1 illustrates schematically a prior art short circulation of a fiber web machine.

FIG. 1 is schematic illustration of a traditional approach flow system or a short circulation of a fiber web machine including means for preparing and providing the headbox of a fiber web machine with fiber web (paper, board or tissue) making stock, so-called furnish. The short circulation comprises means for preparing furnish of at least one thick stock component 4 and filtrate, i.e. white water recovered from the fiber web machine. The means for preparing furnish comprise traditionally one or more vessels 2, sometimes called chests or tanks where one or more thick stock components 4 are diluted with filtrate, so-called white water recovered mainly from the wire section 6 of a fiber web machine 8 to a consistency suitable for web forming. Lately, the preparation of furnish has been performed in specific devices arranged directly in the pipeline, i.e. without any vessels, tanks or chests. The diluted furnish is pumped by means of a pump 10 to optional centrifugal or vortex cleaning 12 comprising one or preferably several stages for removing undesired heavy particles from the furnish. After the optional cleaning with hydrocyclones 12 the furnish is taken to an optional degassing vessel 14, so called deculator, where air harmful for the traditional paper making is removed from the furnish. After optional degassing the furnish is pumped by means of a fan pump or a so-called headbox feed pump 16 to a machine or headbox screen 18, which finalizes the furnish for the production of fiber web by removing any solids of non-desired size from the furnish. Next the furnish flows to the headbox 20 of the fiber web machine 8, and forms a web on the wire (single-wire concept) or between the wires (twin-wire concept) of the wire section 6 of the fiber web machine.

The short circulation of the present invention illustrated schematically in the following FIGS. 2-5 differs from the traditional short circulation in that the short circulation of the present invention does not include the gas separation vessel, as, naturally, now there is no need to separate excess gas from the furnish, as the furnish will be provided with more gas later on in order to prepare the foamed furnish. The rest of the components of the short circulation use the same reference numerals as in FIG. 1. However, it should be understood already at this stage that sometimes the short circulation of the present invention may not necessarily be provided with the vortex cleaning 12, i.e. the hydrocyclones, either.

Figure 2:
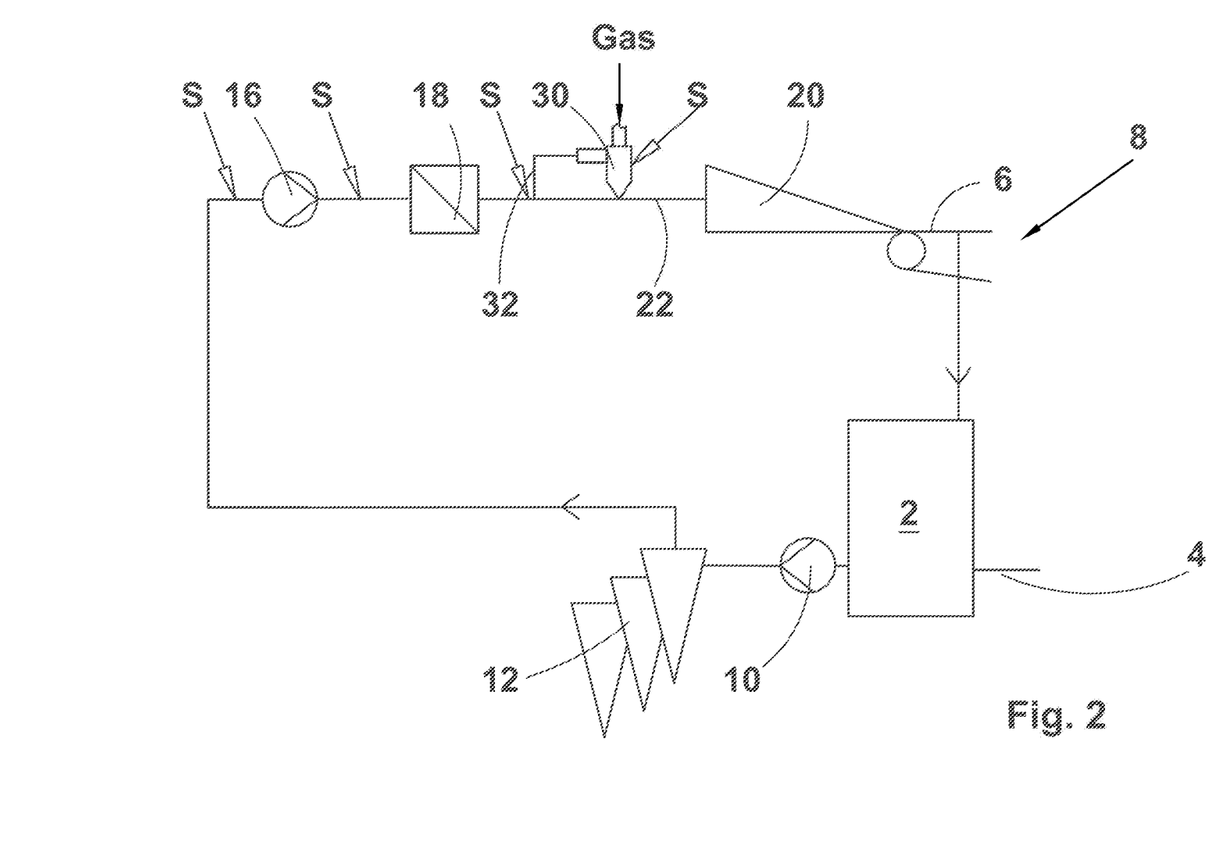
FIG. 2 illustrates schematically a short circulation of a fiber web machine in accordance with a first preferred embodiment of the present invention.

The short circulation of a fiber web machine shown schematically in FIG. 2 is in accordance with a first preferred embodiment of the present invention provided with means for injecting gas to the furnish such that a foamed furnish is formed. Since the injection of mere gas into a pipe flow in a headbox feed pipe 22, or another corresponding flow pipe in the short circulation of a fiber web machine, having a diameter up to one meter or sometimes even more, is in view of efficient mixing, in practice impossible, the injection of gas takes place by means of one or more injection mixers, i.e. by means of an injection mixing station 30. An injection mixing station 30 may comprise one or more injection mixers arranged substantially on the same circumference round the flow pipe. From now on the specification by illustrating a single injection mixers refers to an injection mixing station having one or more mixers. Such injection mixers use an injection liquid assisting in making the gas penetrate the flow of furnish and thus mixing the gas in the furnish all over the cross section of the flow pipe 22. The injection may be performed with one injection mixer if the diameter of the flow pipe is small enough. When the diameter of the flow pipe grows, the number of injection mixers is increased, too. For a pipe diameter of one meter, four or five injection mixers are normally needed to form an injection mixing station. Injection mixers well suitable for the purpose have been discussed, for instance, in EP-B1-1064427, EP-B1-1219344, FI-B-111868, FI-B-115148 and FI-B-116473, which are hereby incorporated by reference. If needed the nozzle construction of the injection mixers 30 may be easily adjusted to control the size of gas bubbles. Sintered nozzles are also possible, but, in such a case, increased pressure has to be taken into account. Additionally, the use of sintered nozzles may weaken the penetration of the gas jet to the furnish whereby the required number of injection mixers has to be reconsidered.

Thus the injection of gas, which is preferably air though also any other suitable gas may be used, as discussed later on, is performed by means of an injection liquid such that the mixture of injection liquid and gas from the mixing station is spread evenly enough on the entire cross section of the flow pipe 22. The injection liquid may be any liquid suitable for its purpose starting from fresh water. However, for environmental reasons the injection liquid is advantageously a liquid that is collected from circulation waters of the mill, like for instance white water or filtrate, of the fiber web machine, or a side flow taken from the furnish itself, i.e. taken to the inlet conduit 32 of the injection mixer/s 30 from the flow pipe 22 upstream of the injection mixing station 30. The latter option has been shown in the Figures, though, naturally, all above listed options are applicable, too.

The formation of foamed furnish is normally performed by providing the furnish with a stabilizer, i.e. a surfactant that stabilizes the foam by preventing the foam bubbles from collapsing such that stable foam flows along the flow pipe 22 to the headbox 20 and therethrough to the wire section 6 of the fiber web machine 8. A prerequisite for the use of the surfactant is that it is mixed with the furnish with the gas, at the latest. In other words, the surfactant S may be injected together with the gas by means of the same injection mixing station 30. In the alternative shown in FIG. 2 the surfactant is brought to the mixings station as one chemical and the gas as another. Another possibility is to add the surfactant S earlier to the furnish. Other reference signs S (outside, i.e. upstream of, the mixing station 30) show three possible optional positions for the mixing of surfactant. In other words, the surfactant S may be introduced to the furnish immediately upstream of the mixing station 30 for gas (either before or after the separation of the sideflow used as the injection liquid), upstream of a headbox screen 18 or upstream of the headbox feed pump 16. The last option, i.e. to feed the surfactant S upstream of the headbox feed pump 16 utilizes the capability of the headbox feed pump 16 to act as an efficient mixer. In other words, when the surfactant S is introduced into the furnish upstream of the headbox feed pump the pump 16 mixes the surfactant evenly throughout the furnish. Now that the furnish is provided with a surfactant S, and gas is injected into and mixed with the furnish containing water, the injected gas bubbles, when meeting fibers, either adhere to the fibers and any other solids or surround the fibers and any other solids in the furnish. The reduced surface tension of the water is not any more able to make the bubbles collapse but the solids are carried or suspended by the bubbles up to the wire section 6 of the fiber web machine 8. The suction from the opposite side of the wire/s makes the bubbles collapse, whereby a web is formed on the wire or between the wires. Additionally, it has to be understood that the surfactant may also be added to the sideflow taken from the flow pipe 22 to the inlet 32 of the injection mixing station 30, whereby, in this way, the surfactant is added together with the gas to the furnish. Also, if the surfactant S is added in the furnish upstream of the point where the sideflow is taken, the injection liquid contains surfactant, too.

Figure 3:
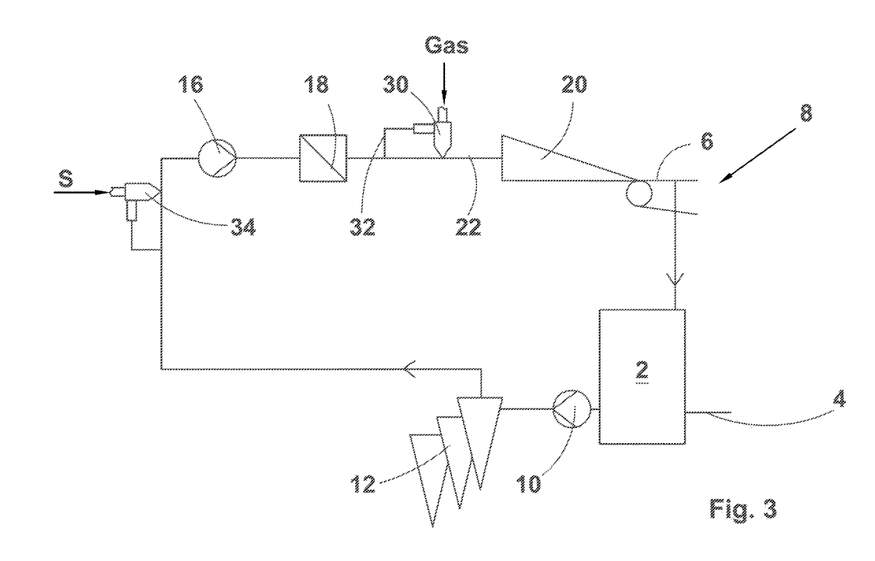
FIG. 3 illustrates schematically a short circulation of a fiber web machine in accordance with a second preferred embodiment of the present invention.

FIG. 3 illustrates as a second preferred embodiment of the present invention a short circulation of a fiber web machine where the surfactant S is introduced into the furnish by means of an injection mixing station 34 of its own. In the illustrated embodiment the furnish itself is used as the injection liquid in the injection mixing station 34. However, any liquid starting from water and including various filtrates or circulation waters available from the mill may be utilized as the injection liquid. When using an injection mixing station 34, the mixing of surfactant S may be performed not only (as shown) far upstream of the injection mixing station 30 for gas, but just before the injection of gas, i.e. between the headbox screen 18 and the mixing station 30, or somewhere earlier in the short circulation. In other words, the injection may also be performed upstream of the headbox screen 18, i.e. between the headbox feed pump 16 and the headbox screen 18, too.

Figure 4:
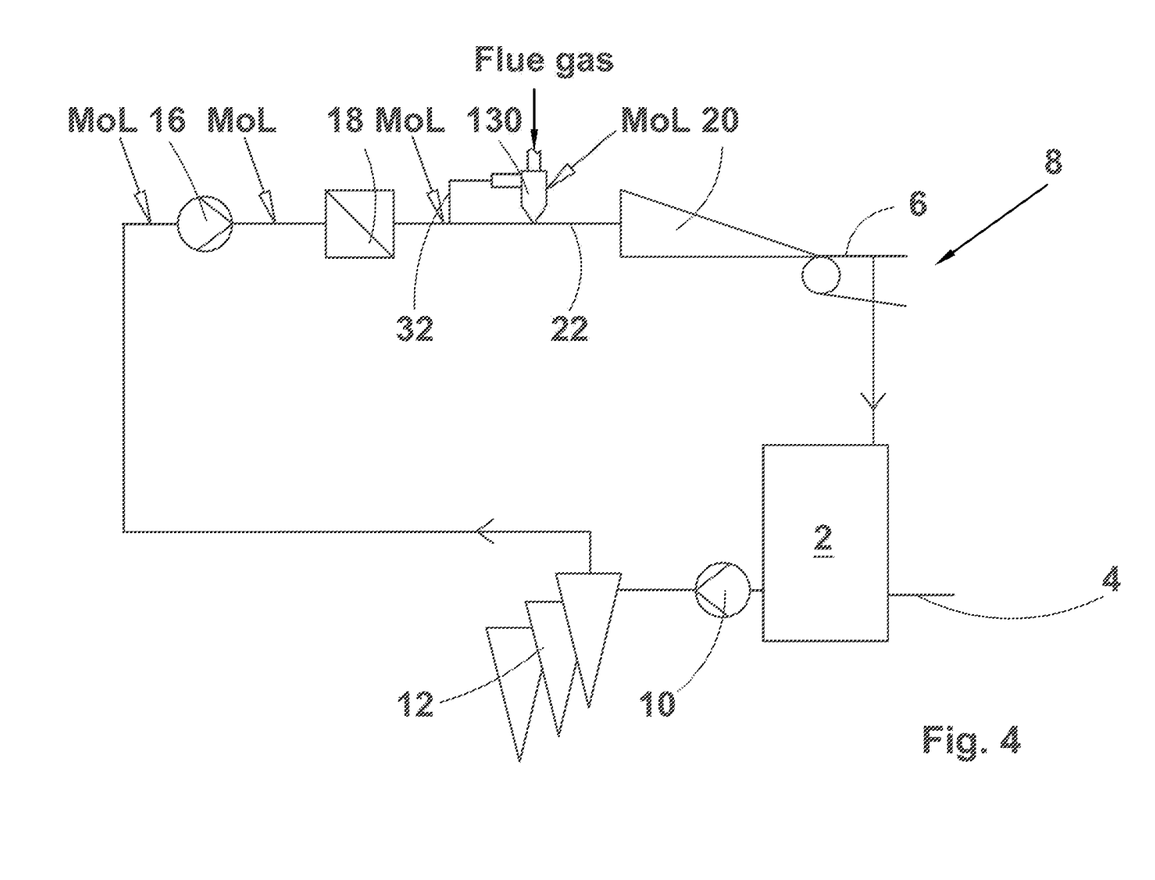
FIG. 4 illustrates schematically a short circulation of a fiber web machine in accordance with a third preferred embodiment of the present invention.

FIG. 4 illustrates schematically a third preferred embodiment of the present invention. The foam formation in the furnish may be performed in exactly the same manner as in the earlier embodiments. In other words, any one of the above discussed optional positions for locating the injection mixing station for gas and introduction of the surfactant may be applied in this embodiment. However, now the gas used in the preparation of foamed furnish is specific, i.e. the gas used in the foam process is a flue gas or combustion gas from a nearby boiler, for instance a bark boiler or a chemical recovery boiler or any other combustion equipment at a suitable distance from the fiber web machine. The flue gas contains some 10-20% carbon dioxide, the remaining part being mainly nitrogen. The flue gas including carbon dioxide is injected into the furnish by means of an injection mixing station 130 such that the flue gas containing carbon dioxide is mixed throughout the furnish. The introduction of the stabilizer or surfactant is not shown, but the surfactant is introduced to the furnish either by means of the same injection mixing station 130 as the flue gas or by any other manner discussed earlier in connection with the embodiments and options/alternatives discussed in FIGS. 2 and 3.

Another specific feature of this embodiment of the present invention is that milk of lime (MoL) is injected into the furnish by any applicable appropriate means. FIG. 4 shows that the milk of lime may be introduced to the furnish together with the flue gas, upstream of the injection mixing station 130 for flue gas, upstream of the headbox screen 18 and/or upstream of the headbox feed pump 16. In fact, the actual position where the introduction of milk of lime into the furnish takes place may be freely chosen. When both carbon dioxide and milk of lime are present in the furnish they react and form precipitated calcium carbonate (PCC) in the furnish. A preferred position for introducing milk of lime is upstream of the headbox feed pump 16, whereby the mixing capability of a centrifugal pump is utilized in mixing the milk of lime evenly into the furnish. Another appropriate position for the introduction of milk of lime to the furnish is to add the milk of lime into the injection liquid used for injecting the flue gas, or into the surfactant. In other words, the milk of lime may be added to the furnish, to the filtrate or to any other circulation water taken from the mill and used as the injection liquid, or to fresh water if such is used as the injection liquid.

Figure 5:
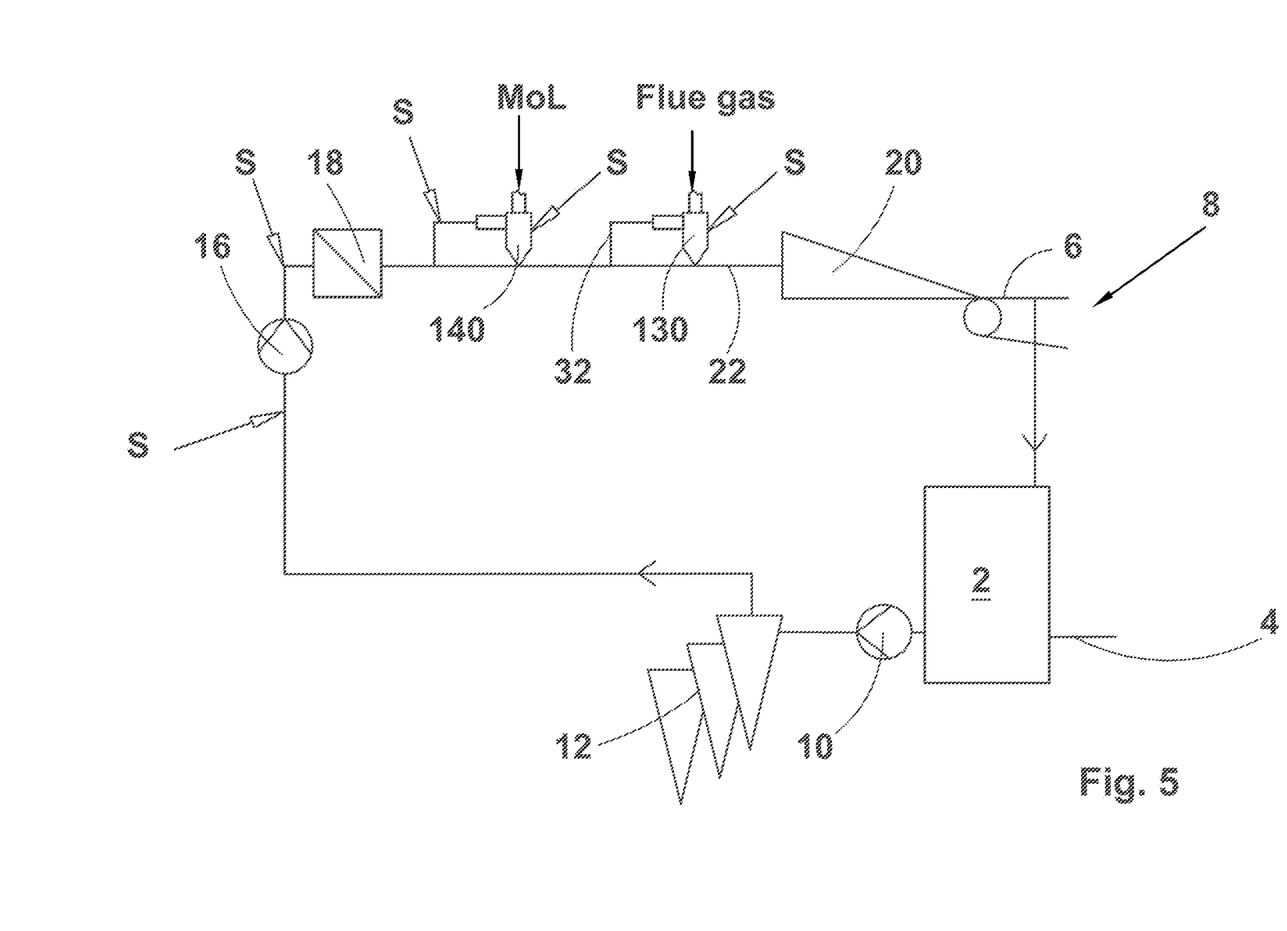
FIG. 5 illustrates schematically a short circulation of a fiber web machine in accordance with a fourth preferred embodiment of the present invention.

FIG. 5 shows, as a fourth preferred embodiment of the present invention, an advantageous way of adding milk of lime into the furnish. The mixing of milk of lime preferably takes place prior to the foam formation, i.e. upstream of the mixing station 130. In other words, here an injection mixing station 140 for the milk of lime is positioned upstream of the mixing station 130 for the flue gas. The milk of lime is injected by using an injection liquid, which is preferably the furnish itself but any liquid starting from fresh water and including various filtrates and circulation waters available from the mill may be utilized as the injection liquid. The injection mixing station 140 for milk of lime may be positioned either immediately upstream of the injection mixing station 130 for gas, but it may as well be positioned upstream of the headbox screen 18, upstream of the headbox feed pump 16, or in any other appropriate location. FIG. 5 also shows a number of optional locations where the foam stabilizer, i.e. the surfactant S may be introduced into the furnish. In addition to the positions disclosed already earlier for the introduction of the surfactant S, FIG. 5 suggests that the surfactant S may be introduced by means of the same mixing station 140 as the milk of lime (MoL). In such a case the surfactant S may be introduced as another chemical in the injection mixer/s, or be added into the injection liquid entering the injection mixer/s.

In the following example it has been considered how well the amount of gas needed for foam formation meets the needs of PCC production. In other words, if the amount of flue gas containing $CO_2$ needed for producing an appropriate amount of PCC was sufficient for foam formation.

In an exemplary case, for the manufacture of a fiber web the need for foam is 40 l/s, the foam density 350 kg/m$^3$ and the consistency of fibers in water 1%. As to the flue gas it may be assumed that the $CO_2$ content of the gas is 15%, the rest being mainly nitrogen. It may, then, be calculated that 35% of the flow of 40 l/s is water and solids (mainly fibers) (density of both 1 kg/dm$^3$). Thereby the mass flow is 40*0.35 kg/s=14 kg/s. Since the fiber consistency is 1% the actual mass flow of fibers is 0.14 kg/s. If the required amount of filler, i.e. PCC is 24% of the amount of fibers, 0.034 kg/s PCC is needed. For the manufacture of 0.1 kg/s PCC 0.34*0.44 kg/s=0.015 kg/s $CO_2$ is needed. This equals to 7.5 l/s $CO_2$, which is about 50 l/s flue gas. Here it has to be understood that the above example is a schematic one, as both the consistency of the paper pulp and the $CO_2$ content of the flue gas may change considerably from the values given in the example. Thus, the example only shows that the amount of $CO_2$ recoverable from flue gas meets well the need of flue gas for the foam formation.

Naturally it has to be understood that if, for some reason, the balance between need of flue gas for the foam formation and the need of $CO_2$ in the flue gas for PCC formation is not found, i.e., as one alternative, the flue gas does not contain a sufficient amount of $CO_2$, i.e. it is a question of flue gas lean in $CO_2$, fresh $CO_2$ may be used. It may be introduced either to the flue gas stream entering the injection station, to the injection mixers of the injection station or be injected already upstream of the injection mixing station to the furnish. The upstream injection may be performed either upstream or downstream of the introduction of the milk of lime or using the same injection mixer or mixer station than the milk of lime. In a corresponding manner, as another alternative, if the flue gas is rich in $CO_2$ the flue gas may be "diluted" by adding gas, most often air, to lower the relative amount of $CO_2$.

Finally, it is worthwhile understanding that contrary to the teachings of FIGS. 2, 3 and 5, and the corresponding passages of the specification the formation of foamed furnish may be performed with mere injection of a sufficient amount of gas into the furnish. However, in such a case, the foamed state of the furnish is very short, whereafter the gas separates from the furnish. In practice, it means that if mere gas is used the gas injection has to take place very close to the web forming. Thus, it should be understood that as another set of embodiments of the present invention the various options discussed in FIGS. 2-5 may be taken by leaving the feeding and mixing of the surfactant out of consideration.

Also it is worthwhile discussing the positioning of the injection mixers or injection mixing stations introducing gas, i.e. the flue gas, and/or $CO_2$ or a mixture of flue gas and $CO_2$ in the short circulation of the fiber web machine. In practice, the gas should be introduced to the short circulation as close to the headbox as possible. In other words, the injection mixer/s or injection mixing station/s should be located either between the headbox screen and the headbox or between the fan pump and the headbox, if there is no headbox screen in the short circulation. The milk of lime MoL may be introduced more freely as it may be introduced either upstream of the fan pump (utilizing the fan pump as a mixer) or downstream of the fan pump.

As can be seen from the above description a novel arrangement for and a method of manufacturing a fibrous web, i.e. paper or board has been developed. While the invention has been herein described by way of examples in connection with what are at present considered to be the preferred embodiments, it is to be understood that the invention is not limited to the disclosed embodiments, but is intended to cover various combinations and/or modifications of its features and other applications within the scope of the invention as defined in the appended claims.

The invention claimed is:

1. An arrangement for manufacturing a fibrous web, the arrangement comprising:
   means for preparing furnish of at least one of a thick stock component and a filtrate,
   means for delivering the furnish toward a headbox of a fiber web machine, and
   a headbox feed pipe comprising an injection mixing station configured to introduce and mix gas into the furnish to form a foamed furnish.

2. The arrangement as in claim 1, wherein the injection mixing station is located between a headbox screen and the headbox.

3. The arrangement as in claim 1, further comprising means for introducing surfactant to the furnish to stabilize the foamed furnish.

4. The arrangement as in claim 3, wherein the means to introduce the surfactant is at least one of: (i) arranged with the injection mixing station for introducing and mixing gas into furnish, (ii) arranged upstream of the injection mixing station for introducing and mixing gas into furnish, and (iii) arranged upstream of the means for delivering furnish towards the headbox of the fiber web machine.

5. The arrangement as in claim 3, wherein the means for introducing surfactant is an injection mixing station.

6. The arrangement as in claim 5, wherein the injection mixing station for introducing surfactant is positioned upstream of a headbox screen or upstream of a headbox feed pump.

7. The arrangement as in claim 1, wherein the injection mixing station is provided with one or more injection mixers each having an inlet conduit for receiving injection liquid.

8. The arrangement as in claim 1 wherein the gas is at least partially flue gas containing carbon dioxide.

9. An arrangement for manufacturing a fibrous web, the arrangement comprising:
- a short circulation flow circuit including a headbox screen, a headbox, a headbox feed pipe between the headbox screen and the headbox, and a wire section downstream of the headbox, wherein the short circulation flow circuit is configured such that a mixture of furnish and water drained from the wire section flows sequentially through the headbox screen, headbox feed pipe and the headbox to the wire section, and
- an injection mixing station connected to the headbox feed pipe and configured to introduce and mix gas into the mixture of furnish and water flowing through the headbox feed pipe to convert the mixture from an unfoamed phase to a foamed phase.

10. An arrangement for manufacturing a fibrous web, the arrangement comprising:
- means for preparing furnish of at least one of a thick stock component and a filtrate,
- means for delivering the furnish toward a headbox of a fiber web machine,
- a headbox feed pipe comprising an injection mixing station configured to introduce and mix gas into the furnish to form a foamed furnish, wherein the injection mixing station is located between a headbox screen and the headbox.

* * * * *